(12) United States Patent
Kobayashi

(10) Patent No.: US 7,871,208 B2
(45) Date of Patent: Jan. 18, 2011

(54) LENS BARREL UNIT WITH LENS BARRIER, AND CAMERA

(75) Inventor: Futoshi Kobayashi, Kashiwa (JP)

(73) Assignee: Canon Kabushiki Kaisha (JP)

( * ) Notice: Subject to any disclaimer, the term of this patent is extended or adjusted under 35 U.S.C. 154(b) by 552 days.

(21) Appl. No.: 11/269,315

(22) Filed: Nov. 8, 2005

(65) Prior Publication Data

US 2006/0098975 A1    May 11, 2006

(30) Foreign Application Priority Data

Nov. 9, 2004  (JP) .............................. 2004-325363

(51) Int. Cl.
 *G03B 17/00* (2006.01)
(52) U.S. Cl. ...................... 396/448; 396/493
(58) Field of Classification Search ................. 396/448, 396/220, 494, 501, 510, 493, 496, 495; 348/362, 348/363
See application file for complete search history.

(56) References Cited

U.S. PATENT DOCUMENTS

| | | | | |
|---|---|---|---|---|
| 3,595,585 A * | 7/1971 | Bristow | ...................... | 277/500 |
| 5,274,410 A * | 12/1993 | Kuwada et al. | ............. | 396/448 |
| 5,614,973 A * | 3/1997 | Azegami | ..................... | 396/448 |
| 6,164,842 A * | 12/2000 | Ohta et al. | .................. | 396/349 |
| 6,469,840 B2 * | 10/2002 | Nomura et al. | ............. | 359/699 |
| 6,510,286 B1 * | 1/2003 | Terada et al. | ................ | 396/177 |
| 6,663,300 B2 * | 12/2003 | Nagae | ......................... | 396/448 |
| 6,749,349 B2 * | 6/2004 | Tanaka | ........................ | 396/454 |
| 7,077,583 B2 * | 7/2006 | Hase | ........................... | 396/448 |
| 7,128,480 B2 * | 10/2006 | Tanaka et al. | ............... | 396/448 |
| 7,150,571 B2 * | 12/2006 | Ichino | ......................... | 396/448 |
| 7,178,999 B2 * | 2/2007 | Stiehler | ....................... | 396/497 |
| 7,457,056 B2 * | 11/2008 | Kobayashi | .................. | 359/811 |
| 7,513,701 B2 * | 4/2009 | Naganuma | .................. | 396/454 |
| 2003/0007802 A1 * | 1/2003 | Noguchi | ..................... | 396/493 |
| 2005/0025476 A1 * | 2/2005 | Onda | .......................... | 396/448 |
| 2005/0135799 A1 * | 6/2005 | Tanaka et al. | ............... | 396/448 |

FOREIGN PATENT DOCUMENTS

| | | |
|---|---|---|
| JP | 2004-45744 A | 2/2004 |
| JP | 2004-69991 A | 3/2004 |
| JP | 2005173166 A * | 6/2005 |

OTHER PUBLICATIONS

Machine translation of JP 2005-173166.*

* cited by examiner

*Primary Examiner*—Christopher E Mahoney
*Assistant Examiner*—Linda B Smith
(74) *Attorney, Agent, or Firm*—Rossi, Kimms & McDowell LLP

(57) ABSTRACT

A lens barrel unit with a lens barrier highly resistant to infiltration of external dirt, dust, and water has a pair of blade members each pivotally movable about a barrier joint hole. Engaging shafts connect to the blade members. The engaging shafts extend coaxially with the barrier joint holes about which the blade members pivotally move. A barrier driving ring applies a driving force to each engaging shafts to rotate it about the corresponding barrier joint hole. The lens barrel has a pair of through holes through which the engaging shafts are rotatably inserted. The engaging shafts are driven for rotation by the driving force transmitted to hook parts of the rotary shaft. The blade members are pivotally movable in the optical axis direction. The lens barrel also serves as a barrier base plate and is disposed between the blade members and the barrier driving ring.

7 Claims, 5 Drawing Sheets

LENS BARREL UNIT WITH LENS BARRIER, AND CAMERA

BACKGROUND OF THE INVENTION

1. Field of the Invention

The present invention relates to a lens barrel unit provided with a lens barrier, and a camera incorporating the lens barrel unit.

2. Description of the Related Art

Conventionally, a compact camera, such as a lens shutter camera, is known which is equipped with a lens cap that can be attached and detached to and from the front of a photographic lens. The lens cap is mounted on the camera when the camera is not used, so as to protect the photographic lens or cut external light.

Further, in recent years, many cameras have come to employ a lens barrier provided in a portion of a camera body thereof or of a lens barrel instead of a lens cap, and drivingly control the lens barrier by a barrier driving means provided in the camera body.

In the following, a lens barrel unit provided with the above-mentioned lens barrier will be described with reference to FIG. 5. FIG. 5 is an exploded perspective view of the conventional lens barrel unit with a lens barrier.

As shown in FIG. 5, the lens barrel unit with a lens barrier includes a lens barrel 102. The lens barrel 102 holds a lens 101 and a barrier base plate 103 as a base for mounting component parts constituting a barrier mechanism. Further, the lens barrel 102 incorporates a lens barrier 104 for protecting the lens 101, and a driving mechanism for the lens barrier 104.

The barrier base plate 103 has an annular shape. The barrier base plate 103 has a pair of engaging shafts 103a formed thereon at locations diametrically opposed in a direction orthogonal to an optical axis, a pair of hooks 103b formed thereon at locations diametrically opposed in the direction orthogonal to the optical axis, and a pair of sectoral cutouts 103c formed in a periphery thereof at locations diametrically opposed in the direction orthogonal to the optical axis.

The lens barrier 104 is comprised of a pair of blade members 104A having the same shape, and the blade members 104A are arranged point-symmetrically with respect to the optical axis. Each blade member 104A is formed therein with an engaging hole 104a serving as the center of rotation of the blade member, a hook 104b for a closing spring 105, and a driving pin 104c disposed at a location away from the engaging hole 104a.

Each engaging shaft 103a extending from the barrier base plate 103 is fitted through an associated one of the engaging holes 104a of the respective blade members 104A, whereby the blade members 104A are supported in a manner rotatable about the respective associated engaging shafts 103a.

Each closing spring 105 is formed by a tensile spring. The closing spring 105 has one end thereof hooked to an associated one of the hooks 104b and the other end thereof hooked to an associated one of the hooks 103b of the barrier base plate 103. The blade members 104A are urged by the respective closing springs 105, for rotation about the respective associated engaging shafts 103a in a counterclockwise (hereinafter abbreviated as CCW) direction as viewed in FIG. 4. In short, the barrier 104 constantly receives a turning force acting in the closing direction.

The driving pin 104c of each blade member 104A is inserted through an associated one of the cutouts 103c of the barrier base plate 103 and extends toward a barrier driving ring 107, described hereinafter.

Further, the lens barrel 102 holds a barrier cover 106 such that the barrier cover 106 and the barrier base plate 103 define therebetween a working space for the blade members 104A constituting the lens barrier 104.

The barrier driving ring 107 is disposed between the lens barrel 102 and the barrier base plate 103, for opening and closing the lens barrier 104. The barrier driving ring 107 is supported by the lens barrel 102 in a manner rotatable about the optical axis. The barrier driving ring 107 is formed with a pair of contact parts 107a at diametrically opposite locations, a hook 107b, and an engaging part 107c projecting toward the lens barrel 102.

Each contact part 107a comes into contact with the driving pin 104c of an associated one of the blade members 104A during rotation of the barrier driving ring 107 to urge the lens barrier 104 in the opening direction. When the contact parts 107a urge the driving pins 104c of the respective associated blade members 104A, the driving pins 104c are pivotally moved about the respective engaging holes 104a. In other words, the blade members 104A constituting the lens barrier 104 are pivotally moved about the respective engaging holes 104a. This causes the lens barrier 104 to form or open a light passing port for the lens 101.

An opening spring 108 formed by a tensile spring has one end thereof hooked to the hook 107b and the other end thereof hooked to a hook 102a formed inside the lens barrel 102. The opening spring 108 constantly urges the barrier driving ring 107, for rotation about the optical axis in a clockwise (hereinafter abbreviated as CW) direction as viewed in FIG. 4.

When the lens barrel unit is not in use, the engaging part 107c is held in contact with an action member, not shown. The action member acts to apply a CCW turning force to the barrier driving ring 107. In doing this, the action member acts on the barrier driving ring 107 against the urging force generated by the opening spring 108, whereby the barrier driving ring 107 is rotated in the CCW direction. As the barrier driving ring 107 is thus rotated, the contact parts 107a move away from the respective associated driving pins 104c. As a consequence, the blade members 104A of the lens barrier 104 are brought into a closed state by the respective closing springs 105. Thus, the lens barrier 104 closes the light passing port for the lens 101 so as to protect the lens 101.

When the lens barrel unit is in use, the positional relationship between the action member and the engaging part 107c is changed such that the action member and the engaging part 107c are disengaged from each other. As a consequence, the barrier driving ring 107 is rotated in the CW direction by the opening spring 108, whereby the contact parts 107a are brought into contact with the respective driving pins 104c. This causes a CW turning force to act on the blade members 104A. At this time, the urging force of the opening spring 108 acting on the barrier driving ring 107 is stronger than the urging force of the closing springs 105 acting on the blade members 104A, so that the blade members 104A are opened. Thus, the light passing port for the lens 101 is opened by the lens barrier 104.

In the above described way, the lens barrier 104 which automatically opens and closes depending on whether or not the lens barrel unit is in use enables the user to use an image pickup apparatus or camera having the lens barrel unit without considering whether to open or close the lens barrier 104, which contributes to improvement of the user-friendliness of the image pickup apparatus (see e.g. Japanese Laid-Open Patent Publications (Kokai) Nos. 2004-069991 and 2004-045744).

However, in the above described conventional lens barrel unit with a lens barrier, since the pair of sectoral cutouts 103c through which the respective driving pins 103c are inserted are formed in the barrier base plate 103, external dirt or dust can enter the working space for the barrier driving ring 107 via the cutouts 103c, which can make the lens barrel unit faulty. Further, it is difficult to provide a waterproof or dripproof function for the image pickup apparatus having the lens barrel unit with a lens barrier.

SUMMARY OF THE INVENTION

It is an object of the present invention to provide a lens barrel unit with a lens barrier, which is highly resistant to infiltration of external dirt, dust, and water, and a camera incorporating the lens barrel unit with a lens barrier.

To attain the above object, in a first aspect of the present invention, there is provided a lens barrel unit with a lens barrier comprising a lens barrier having at least one barrier member pivotally movable about an axis thereof extending parallel with an optical axis, for opening and closing a photographic opening, at least one rotary shaft connected to the barrier member of the lens barrier and extending coaxially with the axis of the barrier member about which the barrier member pivotally moves, driving means for applying a driving force to the rotary shaft, for driving the rotary shaft to rotate about an axis thereof, and a barrier base plate having at least one through hole formed therein, through which the rotary shaft is rotatably inserted, wherein the rotary shaft has a driven part to which the driving force is applied from the driving means, the rotary shaft being driven for rotation by the driving force transmitted to the driven part, the barrier member is caused to pivotally move about the axis thereof extending parallel with the optical axis by the rotation of the rotary shaft, and the barrier base plate is disposed between the barrier member and the driven part of the rotary shaft.

Preferably, the lens barrel unit with a lens barrier comprises waterproofing means provided between a portion of the rotary shaft inserted through the through hole of the barrier member and the barrier base plate.

More preferably, the lens barrel unit with a lens barrier comprises a connecting part provided at one end of the rotary shaft, for connection to the barrier member, and the driven part is provided at another end of the rotary shaft or in a vicinity thereof.

Further preferably, the barrier base plate is formed by a hollow cylindrical member, the hollow cylindrical member having an opening formed therein at one end thereof, in which a lens is fitted, and the through hole formed therein.

To attain the above object, in a second aspect of the present invention, there is provided a lens barrel unit with a lens barrier comprising a lens barrier having at least one barrier member pivotally movable about an axis thereof extending parallel with an optical axis, for opening and closing a photographic opening, at least one rotary shaft connected to the barrier member of the lens barrier and extending coaxially with the axis of the barrier member about which the barrier member pivotally moves, driving means for applying a driving force to the rotary shaft, for driving the rotary shaft to rotate about an axis thereof, a barrier base plate having at least one through hole formed therein, through which the rotary shaft is rotatably inserted, and a connecting part provided at one end of the rotary shaft, wherein the rotary shaft has a driven part provided at another end of the rotary shaft or in a vicinity thereof, to which the driving force is applied from the driving means, the rotary shaft being driven for rotation by the driving force transmitted to the driven part, the barrier member is caused to pivotally move about the axis thereof extending parallel with the optical axis by the rotation of the rotary shaft, and the barrier base plate is disposed between the barrier member and the driven part of the rotary shaft.

To attain the above object, in a third aspect of the present invention, there is provided a camera comprising the lens barrel unit with a lens barrier according to the first aspect of the present invention.

To attain the above object, in a fourth aspect of the present invention, there is provided a camera comprising the lens barrel unit with a lens barrier according to the second aspect of the present invention.

To attain the above object, in a fifth aspect of the present invention, there is provided a lens barrel unit with a lens barrier comprising a lens barrier having at least one barrier member pivotally movable for opening and closing a photographic opening, at least one rotary shaft extending coaxially with an axis of the barrier member about which the barrier member pivotally moves, and driving means pivotally movable with movement of the lens barrel unit with a lens barrier, for rotatively driving the rotary shaft to rotate about an axis thereof.

Preferably, the lens barrel unit with a lens barrier comprises waterproofing means provided on the rotary shaft.

More preferably, the lens barrel unit with a lens barrier comprises a connecting part provided at one end of the rotary shaft, for connection to the barrier member, and the driving means is provided in a vicinity of another end of the rotary shaft.

To attain the above object, in a sixth aspect of the present invention, there is provided a camera comprising the lens barrel unit with a lens barrier according to the fifth aspect of the present invention.

According to the present invention, it is possible to provide a lens barrel unit with a lens barrier, which is highly resistant to infiltration of external dirt, dust, and water, and a camera incorporating the lens barrel unit with a lens barrier.

The above and other objects, features, and advantages of the invention will become more apparent from the following detailed description taken in conjunction with the accompanying drawings.

BRIEF DESCRIPTION OF THE DRAWINGS

FIGS. 4A to 4C are views schematically showing the positional relationship between an engaging part of a barrier driving ring of the lens barrel unit with a lens barrier in FIG. 1 and a fixed member fixed to a camera body, in which:

FIG. 4A shows a state where the engaging part of the barrier driving ring is in contact with a sloped surface of the fixed member;

FIG. 4B shows a state immediately before the engaging part of the barrier driving ring becomes disengaged from the sloped surface of the fixed member; and FIG. 4C shows a state where the engaging part of the barrier driving ring has been disengaged from the sloped surface of the fixed member.

DETAILED DESCRIPTION OF THE PREFERRED EMBODIMENTS

The present invention will now be described in detail below with reference to the drawings showing a preferred embodiment thereof.

Figure 1:
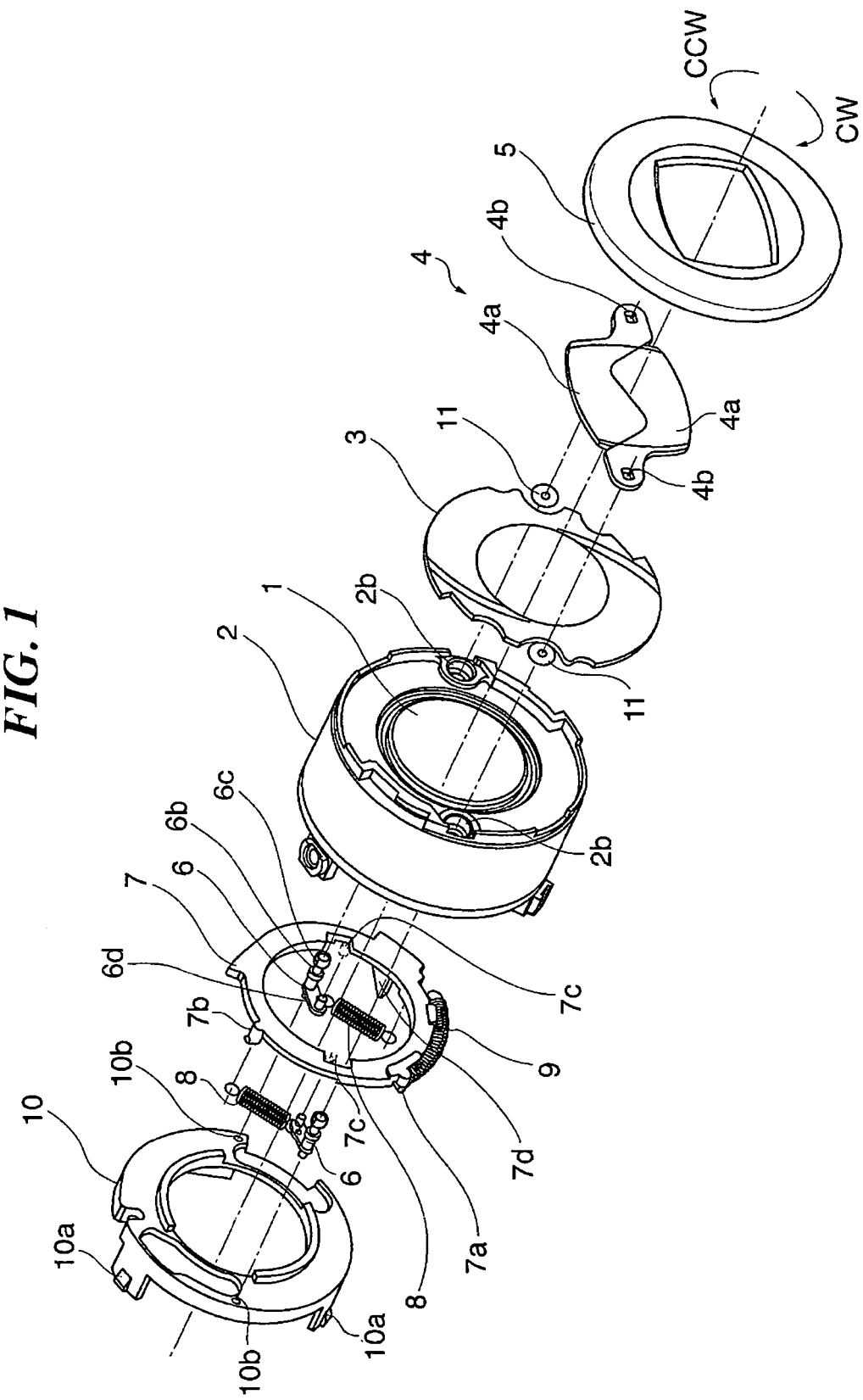
FIG. 1 is an exploded perspective view showing the construction of a lens barrel unit with a lens barrier according to an embodiment of the present invention.
Figure 2:
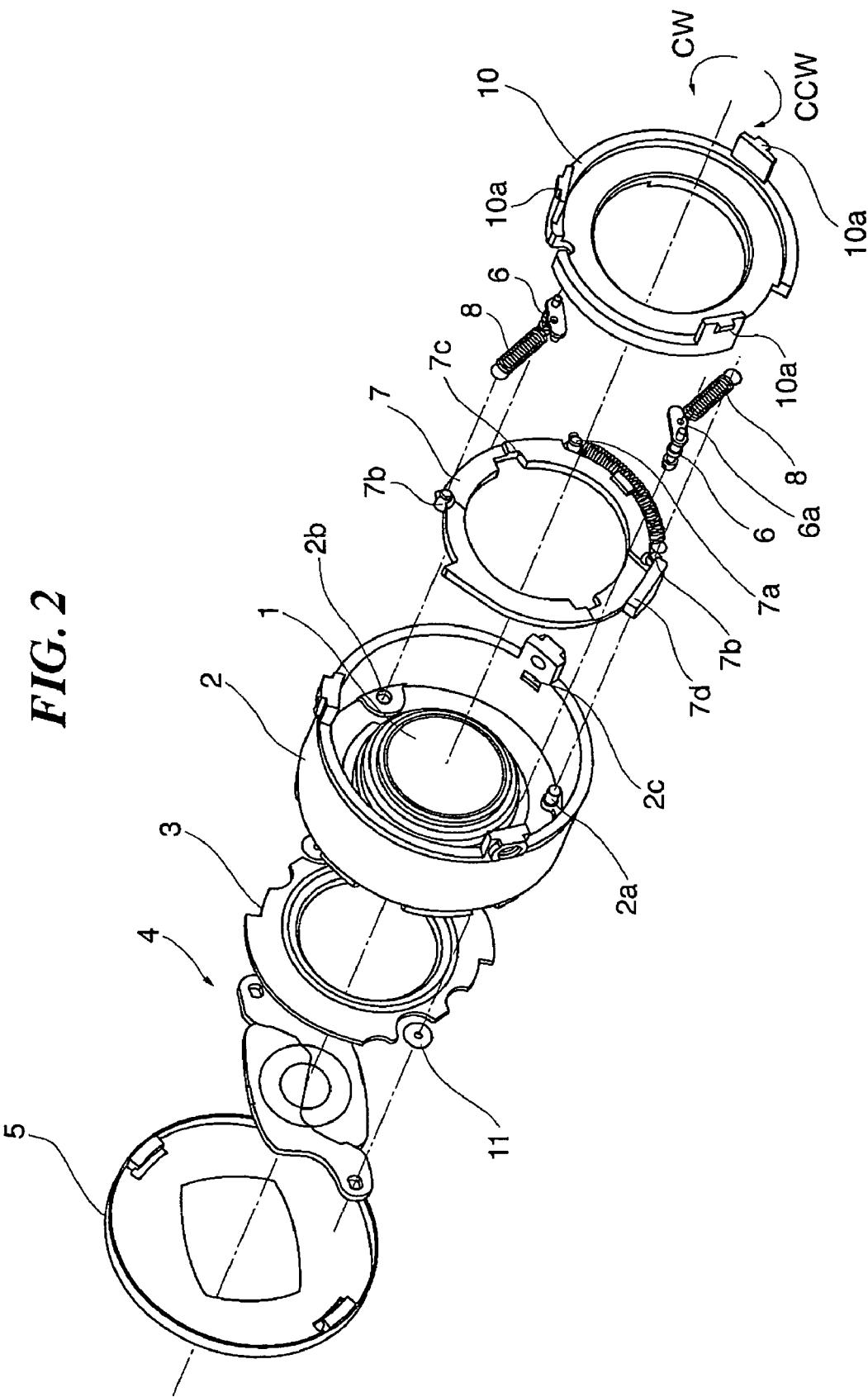
FIG. 2 is an exploded perspective view of the lens barrel unit in FIG. 1, as viewed from a different direction.
Figure 3:
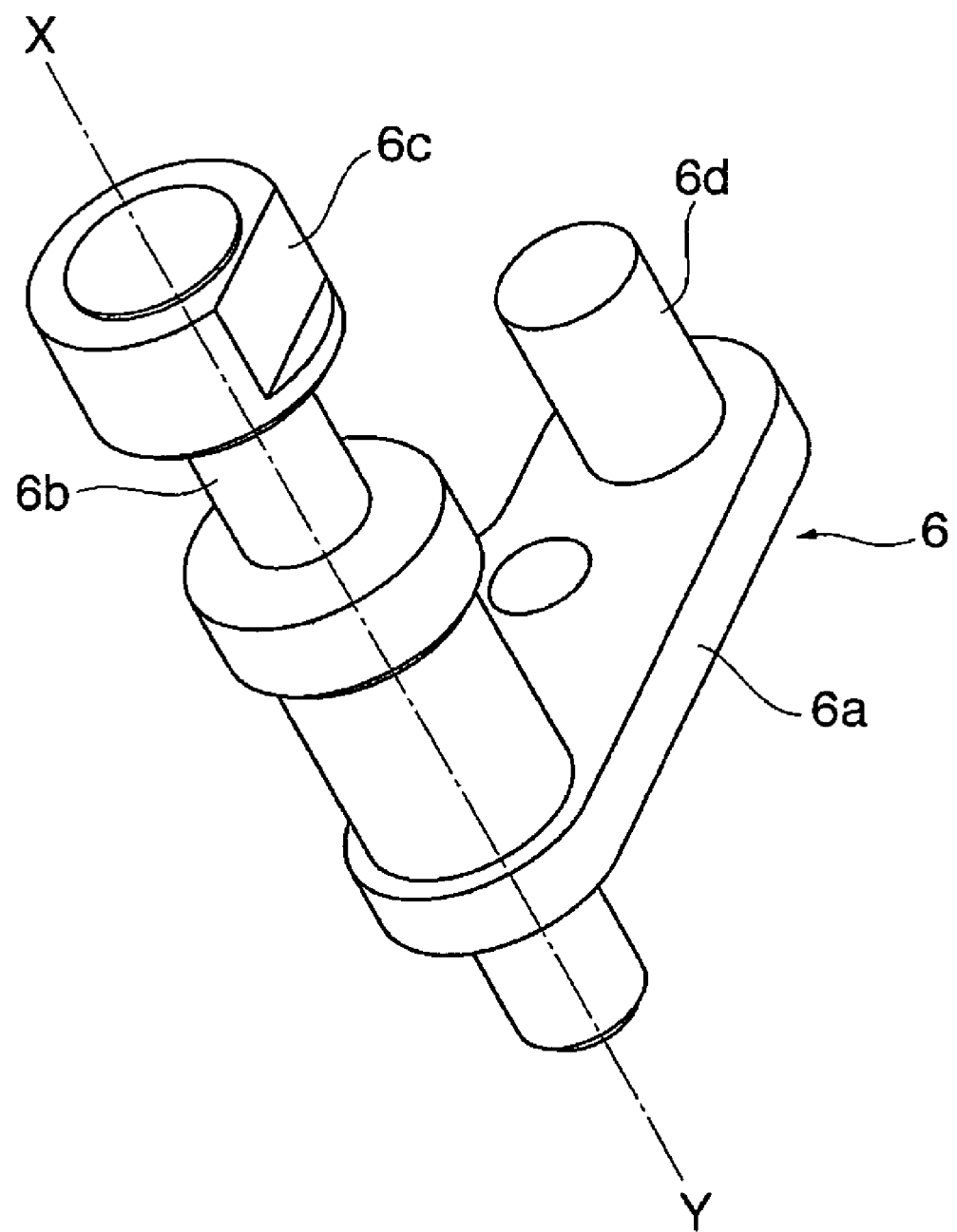
FIG. 3 is a perspective view showing the construction of an engaging shaft appearing in FIG. 1.
Figure 4A:
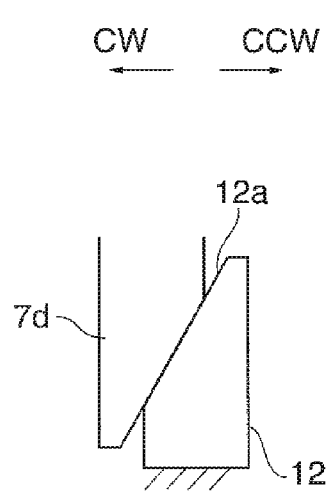
Figure 4B:
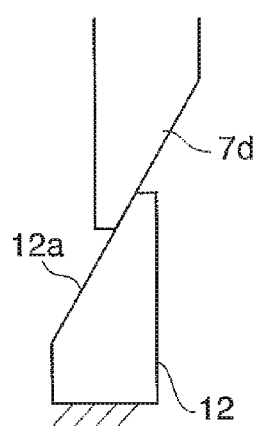
Figure 4C:
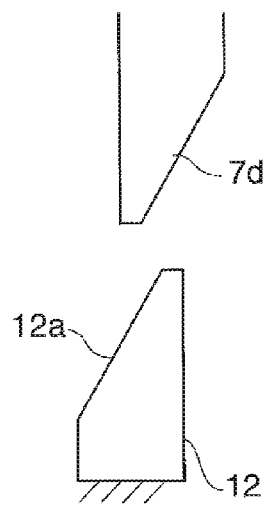
Figure 5:
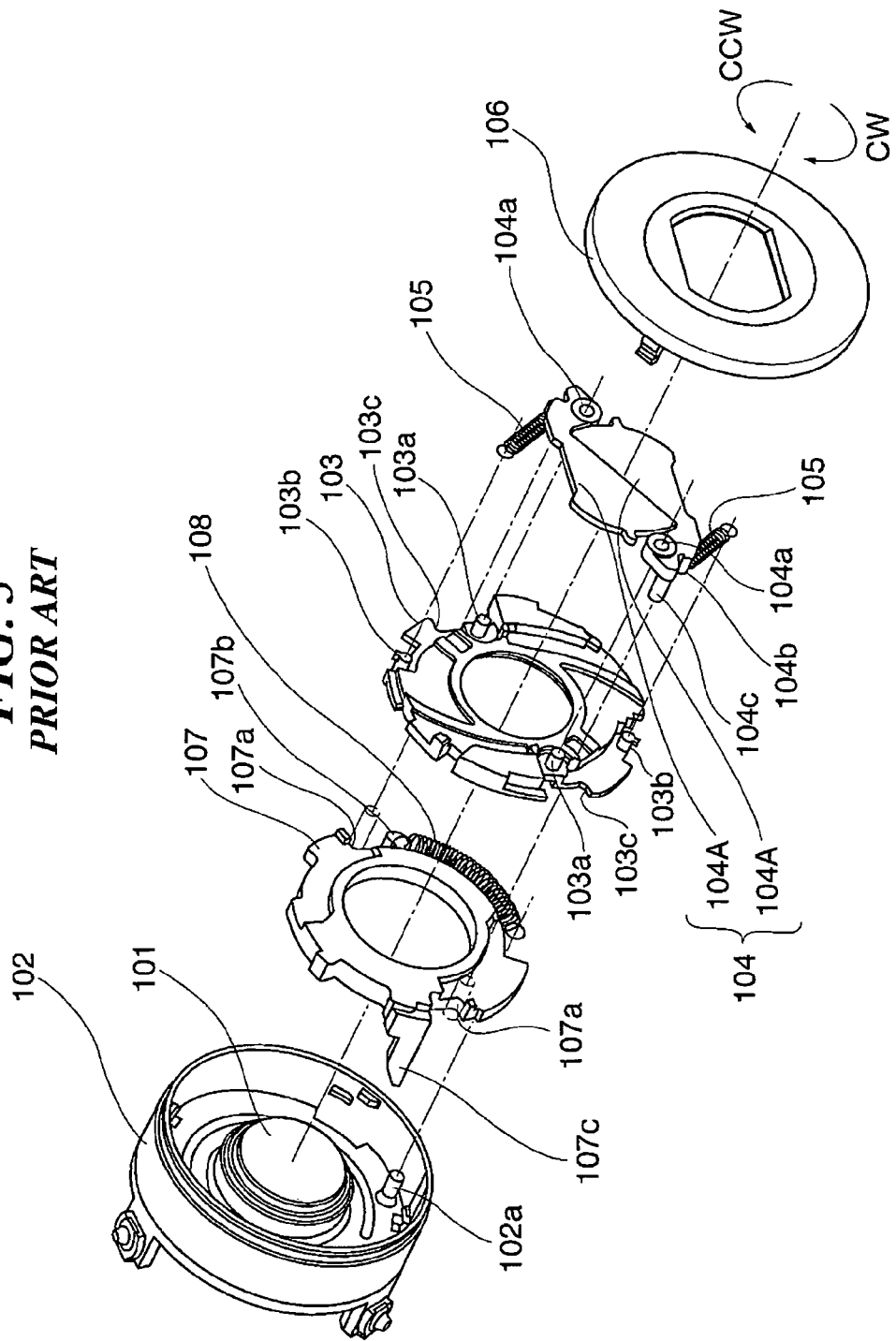
FIG. 5 is an exploded perspective view showing the construction of a conventional lens barrel unit with a lens barrier.

FIG. 1 is an exploded perspective view showing the construction of a lens barrel unit with a lens barrier according to an embodiment of the present invention, and FIG. 2 is an exploded perspective view of the lens barrel unit in FIG. 1, as viewed from a different direction. FIG. 3 is a perspective view showing the construction of an engaging shaft appearing in FIG. 1. FIGS. 4A to 4C are views schematically showing the positional relationship between an engaging part of a barrier driving ring of the lens barrel unit with a lens barrier in FIG. 1 and a fixed member fixed to a camera body, in which FIG. 4A shows a state where the engaging part of the barrier driving ring is in contact with a sloped surface of the fixed member, FIG. 4B shows a state immediately before the engaging part of the barrier driving ring becomes disengaged from the sloped surface of the fixed member, and FIG. 4C shows a state where the engaging part of the barrier driving ring has been disengaged from the sloped surface of the fixed member.

As shown in FIGS. 1 and 2, the lens barrel unit with a lens barrier has a lens barrel 2, and the lens barrel 2 has a front end closer to the object which is formed therein with an opening for holding a lens 1, and a rear end formed as an open end. The lens 1 is bonded by an adhesive to the front end of the lens barrel 2 such that a gap between the lens 1 and the lens barrel 2 is sealed. A decorative panel 3, a lens barrier 4, and a barrier cover 5 are mounted to the front of the lens barrel 2. A barrier driving ring (driving means) 7, a pair of engaging shafts (rotary shafts) 6, and a lid 10 are mounted inside the lens barrel 2. The lens barrel 2 also serves as a barrier base plate as a base for mounting the above-mentioned component parts. When the lens barrel unit is in use, the lens barrel 2 is moved to a use position (shooting-permitting position) by an actuator, not shown, provided inside a camera body, whereas when the lens barrel unit is not in use, the lens barrel 2 is moved to a non-use position (retracted position).

The lens barrel 2 has a hook 2a (see FIG. 2), a pair of through holes 2b formed at diametrically opposite locations, and three recesses 2c (see FIG. 2). The hook 2a is formed on a rear surface of the lens barrel 2. Each through hole 2b is formed such that it has an increased-diameter part on a side thereof close to the front end of the lens barrel 2. The recesses 2c are formed in an inner peripheral surface of the lens barrel 2 at equal space intervals.

The decorative panel 3 is bonded to the lens barrel 2 by an adhesive in a manner covering at least the bonded part between the lens 1 and the lens barrel 2, which are bonded to each other by the adhesive as mentioned above. The lens barrier 4 is formed by a pair of blade members (barrier members) 4a having the same shape. The blade members 4a are arranged point-symmetrically with respect to an optical axis. Each blade member 4a is formed therein with a barrier joint hole 4b, and the blade members 4a are pivotally moved about the respective barrier joint holes 4b. It should be noted that the number and shape of the blade members 4a forming the lens barrier 4 are not limited to those mentioned above. The barrier cover 5 is bayonet-coupled to the lens barrel 2. When forming a bayonet shape on the lens barrel 2, a so-called outer slide is used so as to prevent a hole from being formed by machining. The barrier cover 5 and the decorative panel 3 define therebetween a working space for the barrier 4.

The barrier driving ring 7 is slidably fitted in the lens barrel 2 and supported in a manner rotatable about the optical axis. The barrier driving ring 7 is formed with a hook 7a to which one end of an opening spring 9 is hooked, a pair of hooks 7b for a closing spring 8, a pair of recesses 7c, and an engaging part 7d. The hooks 7b are diametrically opposed to each other. The recesses 7c are formed in an inner peripheral surface of the barrier driving ring 7 at locations diametrically opposed to each other. The engaging part 7d is held in contact with the fixed member fixed to the camera body when the lens barrel unit is not in use. During shooting, the engaging part 7d is moved out of contact with the fixed member. This operation will be described in detail hereinafter. The above-mentioned end of the opening spring 9 is hooked to the hook 7a, as described above, and the other end thereof hooked to the hook 2a of the lens barrel 2. The barrier driving ring 7 is urged in the CCW direction by the opening spring 9.

The lid 10 is formed by an annular member disposed in the lens barrel 2 coaxially with the optical axis, and has three nails 10a formed in an outer periphery thereof. The nails 10a are arranged at equal space intervals, and each nail 10a has a shape engageable with an associated one of the recesses 2c in the lens barrel 2. Further, the lid 10 has a pair of engaging holes 10b formed therein at diametrically opposite locations. The lid 10 is held in the lens barrel 2 by engagement between the nails 10a and the respective associated recesses 2c such that the engaging holes 10b are positioned coaxially with the respective associated through holes 2b of the lens barrel 2. The lid 10 defines a working space in the lens barrel 2 for the barrier driving ring 7 and the engaging shafts 6.

Each engaging shaft 6 will now be described in detail with reference to FIG. 3. Each engaging shaft 6 has a two-face chamfered barrier joint part 6c formed at one end of the engaging shaft 6 along an axis XY thereof, a reduced-diameter shaft part 6b formed at an intermediate portion thereof, and a hook (driven part) 6a, which has a through hole formed therein for hooking a closing spring 8, referred to hereinafter, formed in the vicinity of the other end thereof. The hook 6a of the engaging shaft 6 extends in a direction orthogonal to the axis of the engaging shaft 6, with a driving pin 6d axially projecting from an end of the hook 6a. The driving pin 6d of the engaging shaft 6 is held in contact with an associated one of the recesses 7c of the barrier driving ring 7. Each engaging shaft 6 is inserted through an associated one of the through holes 2b of the lens barrel 2 via an associated one of the recesses 7c of the barrier driving ring 7. The barrier joint part 6c of the engaging shaft 6 is fitted in the barrier joint hole 4b of an associated one of the blade members 4a. The reduced-diameter part 6b of the engaging shaft 6 is inserted through an O ring 11 fitted in the increased-diameter part of the associated through hole 2b, and the other end of the engaging shaft 6 is rotatably fitted in an associated one of the engaging holes 10b of the lid 10. The engaging shafts 6 are rotatably supported by the lens barrel 2 and the lid 10, and arranged point-symmetrically with respect to the optical axis.

Each O ring 11 is elastically deformed between the increased-diameter part of an associated one of the through holes 2b and the reduced-diameter part 6b of an associated one of the engaging shafts 6 to fill a gap between the reduced-diameter part 6b and the through hole 2b. This prevents dust, water, and the like from entering the lens barrel 2 through the gap between each engaging shaft 6 and the associated one of the through holes 2b, which makes it possible to obtain waterproof performance at a predetermined level. The waterproof performance is only required to be at a JIS level 4 or so, for example. In this case, the outer diameter of the O ring 11 is set assuming that the O ring 17 is compressed by approximately 7% to 10% in outer diameter. It should be noted that if the increased-diameter part of the through hole 2b is reduced in size and the elastic deformation rate of the O ring 11 is increased, it is possible to obtain higher-level waterproof performance. In this case, however, resistance which the engaging shaft 6 receives during rotation increases, and hence a larger driving force is required to rotate the engaging shaft 6.

One end of each closing spring 8 is hooked to the hook 6a of an associated one of the engaging shafts 6. The closing spring 8 is formed by a tensile spring for urging an associated one of the blade members 4a of the lens barrier 4 in its closing direction, i.e. in the CW direction. The other end of the closing spring 8 is hooked to an associated one of the hooks 7b of the barrier driving ring 7. With this arrangement, a turning force acting in the CCW direction is applied to each engaging shaft 6 by an associated one of the closing springs 8 in a state where the driving pin 6d is held in contact with an associated one of the recesses 7c of the barrier driving ring 7.

With the above-described driving relationship, the pivotal movement of the barrier driving ring 7 is converted into rotative driving of each engaging shaft 6 about the axis XY thereof.

Next, a description will be given of a procedure of assembly of the above described lens barrel unit with a lens barrier.

First, the lens 1 is fitted in the opening or hole formed in the lens barrel 2, and bonded to the lens barrel 2 by an adhesive. At this time, the gap produced between the periphery of the lens 1 and the lens barrel 2 is sealed by the adhesive, whereby the gap is subjected to waterproofing treatment. Then, the decorative panel 3 is bonded to the lens barrel 2 by an adhesive.

Next, the barrier driving ring 7 is fitted into the lens barrel 2 from the rear surface side. The barrier driving ring 7 is slidably fitted into the lens barrel 2, to be supported in a manner rotatable about the optical axis. At this time, the opening spring 9 is hooked at one end thereof to the hook 7a and at the other end thereof to the hook 2a. As a consequence, the barrier driving ring 7 is constantly urged in the CCW direction.

Next, the engaging shafts 6 are mounted to the lens barrel 2. First, the engaging shafts 6 are inserted through the respective associated through holes 2b of the lens barrel 2. At this time, the driving pin 6d of each engaging shaft 6 is positioned so as to be in contact with an associated one of the recesses 7c of the barrier driving ring 7. Further, each closing spring 8 is hooked at one end thereof to the hook 6a of an associated one of the engaging shafts 6, and at the other end thereof to an associated one of the hooks 7b of the barrier driving ring 7. As a consequence, a turning force acting in the CCW direction is applied to each of the engaging shafts 6 by an associated one of the closing springs 8.

Next, the lid 10 is inserted into the lens barrel 2, and the nails 10a of the lid 10 are engaged with the respective associated recesses 2c of the lens barrel 2. Thus, the lid 10 is held by the lens barrel 2. When the lid 10 is fitted into the lens barrel 2, the other end of each engaging shaft 6 is fitted in an associated one of the engaging holes 10b of the lid 10, whereby the engaging shaft 6 is rotatably fitted and supported by the lens barrel 2 and the lid 10. The lid 10 and the lens barrel 2 define therebetween the working space for the barrier driving ring 7, with the barrier driving ring 7 being prevented from falling off. Further, since each engaging shaft 6 is rotatably fitted and supported at two points i.e. in an associated one of the through holes 2b of the lens barrel 2 and an associated one of the engaging holes 10b of the lid 10, shakes caused by rotation of the engaging shafts 6 can be reduced. Furthermore, the lid 10 prevents the engaging shafts 6 from falling off rearward from the lens barrel 2.

Next, the O rings 11 as waterproofing means are fitted into the lens barrel 2. More specifically, each O ring 11 is press-fitted into the increased-diameter part of an associated one of the through holes 2b so as to receive the reduced-diameter part of an associated one of the engaging shafts 6 therein. At this time, the O ring 11 is elastically deformed between the engaging shaft 6 and the through hole 2b, whereby the waterproof performance of the predetermined level equivalent e.g. to the JIS level 4 can be obtained as mentioned above.

Next, the lens barrier 4 is mounted to the lens barrel 2. The barrier joint part 6c formed on the one end of each engaging shaft 6 is press-fitted into the barrier joint hole 4b of an associated one of the blade members 4a of the lens barrier 4, whereby the blade members 4a and the respective associated engaging shafts 6 are fixedly connected to one another. Thus, each of the blade members 4a is allowed to pivotally move about the corresponding engaging shaft 6 with rotation of the engaging shaft 6.

Next, the barrier cover 5 is mounted to the lens barrel 2. The barrier cover 5 is bayonet-coupled to the lens barrel 2. The barrier cover 5 receives the respective ends of the engaging shafts 6 and hence plays the role of a stopper for preventing the engaging shafts 6 from falling off in the optical axis direction.

The lens barrel unit with a barrier is thus assembled in the above described way. As is apparent from the above description, the lens barrel 2 also plays the role of a barrier base plate as a base for the component parts, such as the engaging shafts 6 and the lens barrier 4, which constitute a barrier mechanism. In short, in the present embodiment, the lens barrel 2 also corresponds to the barrier base plate in the prior art.

Next, a description will be given of the operation of the lens barrier mechanism in the present embodiment.

When the lens 1 is not used for shooting, the lens barrel 2 is moved to the non-use position (retracted position) by the actuator, not shown, provided in the camera body. As the lens barrel 2 is moved, the engaging shafts 6 are rotated in the CCW direction to rotate the respective blade members 4a into a state where the blade members 4a are held in contact with each other. Thus, the lens barrier 4 is fully closed.

More specifically, with the movement of the lens barrel 2 to the non-use position (in the optical axis direction), the engaging part 7d of the barrier driving ring 7 is moved toward the fixed member 12 in the optical axis direction and brought into contact with a sloped surface 12a of the fixed member 12, as shown in FIGS. 4B and 4C. When the engaging part 7d of the barrier driving ring 7 comes into contact with the sloped surface 12a of the fixed member 12, the sloped surface 12a of the fixed member 12 acts to cause the barrier driving ring 7 to rotate in the CW direction against the CCW turning force applied to the ring 7 by the opening spring 9 (see FIGS. 4A and 4B). At this time, the engaging shafts 6 are constantly urged by the respective associated closing springs 8 in the CCW direction, with their driving pins 6d held in contact with the respective associated recesses 7c. Consequently, the driving pins 6d pivotally move with the CW rotation of the barrier driving ring 7 over a predetermined range, whereby the engaging shafts 6 rotate about the axis XY thereof in the CCW direction.

In this way, the pivotal movement of the barrier driving ring 7 is converted into rotative driving of each engaging shaft 6 about the axis XY thereof. With this rotation of the engaging shafts 6, the respective blade members 4a rotate in the CCW direction until they come into contact with each other. Thus, the barrier 4 is fully closed.

When shooting, the lens barrel 2 is moved in the optical axis direction from the non-use position to the use position. In this case, as shown in FIGS. 4C and 4B, the engaging part 7d of the barrier driving ring 7 is moved away from the fixed member 12 along the optical axis. During the movement in the optical axis direction, the engaging part 7d is rotated by the CCW turning force of the opening spring 9 in the CCW direction along the sloped surface 12a of the fixed member 12 (FIGS. 4B and 4A). Thus, the barrier driving ring 7 is rotated in the CCW direction. At this time, since the respective driving pins 6d of the engaging shafts 6 are held in contact with the respective associated recesses 7c, the driving pins 6d pivotally move with the CCW rotation of the barrier driving ring 7 over a predetermined range, whereby the engaging shafts 6 rotate about the axis XY thereof in the CW direction. Namely, the pivotal movement of the barrier driving ring 7 is converted into rotative driving of each engaging shaft 6 about the axis XY thereof. This rotation of the engaging shafts 6 causes the blade members 4a to rotate in the CW direction, whereby the barrier 4 is opened. At the same time, the engaging part 7d of the barrier driving ring 7 and the sloped surface 12a of the fixed member 12 are disengaged from each other. When disengaged, the barrier driving ring 7 is held in a predetermined position by the urging force of the opening spring 9 with the recesses 7c held in contact with the respective associated driving pins 6d, whereby the barrier 4 is held in a fully open state.

As described above, according to the present embodiment, the lens barrier 4 is provided on the front side of the lens barrel 2 forming the barrier base plate, and the respective driving pins 6d of the engaging shafts 6 are disposed on the rear side of the lens barrel 2. Therefore, as is distinct from the conventional lens barrier unit in which the barrier base plate 103 is formed therein with the pair of sectoral cutouts 103c through which the respective associated driving pins 104c are inserted, it is not necessary to form the sectoral cutouts 103c in the lens barrel 2 (barrier base plate), and hence it is possible to prevent dust or dirt from externally entering the lens barrel 2 through the cutouts 103c. This makes it possible to suppress occurrence of troubles in lens barrier driving.

Further, since the O ring 11 is fitted between each of the engaging shafts 6 and an associated one of the through holes 2b, it is possible to obtain waterproof performance at the predetermined level, thereby preventing occurrence of sliding failure between component parts and oozing of oil due to water infiltration.

Thus, a lens barrel unit with a lens barrier can be provided which is highly resistant to infiltration of external dirt, dust, and water into the lens barrel.

Further, a camera can be provided which is highly resistant to infiltration of external dirt, dust, and water via the lens barrel.

CROSS REFERENCE TO RELATED APPLICATION

This application claims priority from Japanese patent Application No. 2004-325363 filed Nov. 9, 2004, which is hereby incorporated by reference herein.

What is claimed is:

1. A lens barrel unit with a lens barrier comprising:
barrier members that pivotally move about an axis extending parallel with an optical axis, for opening and closing a photographic opening;
rotary shafts each respectively connected to corresponding one of said barrier members and extending coaxially with the axis of said barrier members about which said barrier members pivotally move;
a driving member that applies a driving force to each of the rotary shafts, for shifting said rotary shafts to pivotally move the barrier members; and
a lens holding member having a lens and through holes formed therein, through each of which one of said rotary shafts is rotatably inserted,
wherein:
each of said rotary shafts has an integrally formed driven part to which the driving force is applied from said driving member to pivotally move the respective barrier member, said rotary shafts being shifted for rotation by the driving force transmitted to the respective driven parts; and
said lens holding member is disposed between said barrier members and said driven parts of said rotary shafts.

2. A lens barrel unit with a lens barrier, as claimed in claim 1, further comprising a waterproofing barrier having a through hole provided between a portion of each of said rotary shafts inserted through the respective through holes of the respective barrier member and said lens holding member.

3. A lens barrel unit with a lens barrier, as claimed in claim 2, further comprising a connecting part provided at one end of each of said rotary shafts, for connection to said barrier members, and the respective driven part is provided at another end of each of said rotary shafts or in a vicinity thereof.

4. A lens barrel unit with a lens barrier, as claimed in claim 3, wherein said lens holding member is formed by a hollow cylindrical member having an opening formed therein at one end thereof, in which a lens is fitted, and the through holes formed therein.

5. A lens barrel unit with a lens barrier comprising:
barrier members that pivotally move about an axis extending parallel with an optical axis, for opening and closing a photographic opening;
rotary shafts each respectively connected to corresponding one of said barrier members and extending coaxially with the axis of said barrier members about which said barrier members pivotally move;
a driving member that applies a driving force to each of the rotary shafts, for driving shifting said rotary shafts to pivotally move the barrier members;
a lens holding member having a lens and through holes formed therein, through each of which one of said rotary shafts is rotatably inserted, and
a connecting part provided at one end of each of said rotary shafts,
wherein:
each of said rotary shafts has an integrally formed driven part provided at another end thereof or in a vicinity thereof, to which the driving force is applied from said driving member, said rotary shafts being shifted for rotation by the driving force transmitted to the respective driven parts to pivotally move the barrier members; and
said lens holding member is disposed between said barrier members and said driven parts of said rotary shafts.

6. A camera comprising a lens barrel unit with a lens barrier as claimed in claim 1.

7. A camera comprising a lens barrel unit with a lens barrier as claimed in claim 5.

* * * * *

UNITED STATES PATENT AND TRADEMARK OFFICE
CERTIFICATE OF CORRECTION

| | | |
|---|---|---|
| PATENT NO. | : 7,871,208 B2 | Page 1 of 1 |
| APPLICATION NO. | : 11/269315 | |
| DATED | : January 18, 2011 | |
| INVENTOR(S) | : Kobayashi | |

It is certified that error appears in the above-identified patent and that said Letters Patent is hereby corrected as shown below:

On the Title Page:
In Item (75) Inventor field correct an error in the Inventors city of residence as follows:

REMOVE: Kashiwa

INSERT: --Kawasaki-shi--

Signed and Sealed this
Eighth Day of March, 2011

David J. Kappos
*Director of the United States Patent and Trademark Office*